June 3, 1941. E. ERNI 2,244,450
PACKING GLAND
Filed April 17, 1939
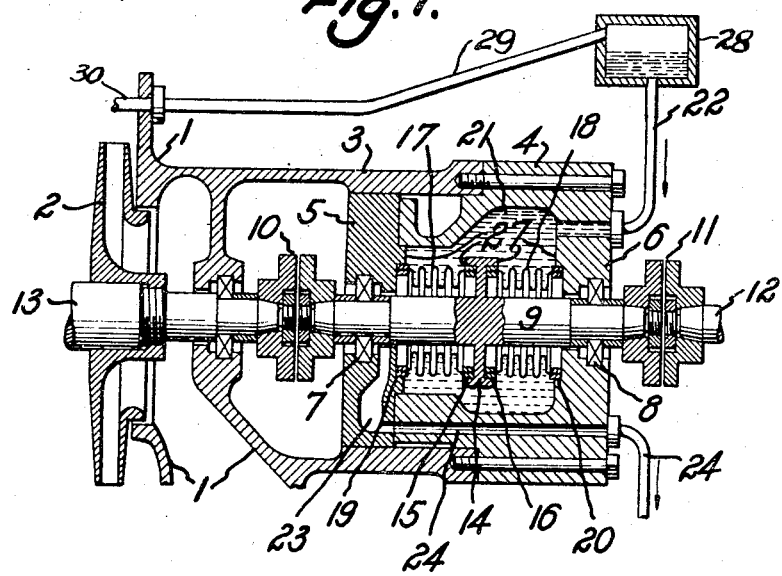
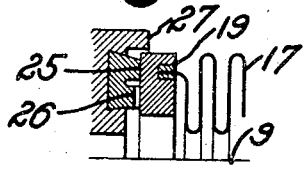
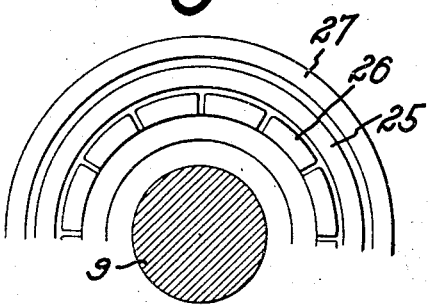
Inventor:
Edoardo Erni,
By Potter, Pierce & Schaffler
Attorneys.

Patented June 3, 1941

2,244,450

UNITED STATES PATENT OFFICE 2,244,450

PACKING GLAND

Edoardo Erni, Baden, Switzerland, assignor to Aktiengesellschaft Brown, Boveri & Cie., Baden, Switzerland, a joint-stock company Application April 17, 1939, Serial No. 268,433
In Germany April 28, 1938

5 Claims. (Cl. 286—11)

The invention relates to packing glands for rotating shafts and especially to liquid sealed glands in which two slip-rings rotating with the shaft are pressed in opposite directions of the axis against bearing surfaces. Such glands are particularly suitable for refrigerant pumps or fans.

A principal object of the invention is the provision of a packing gland construction including slip-rings in which the sealing pressure is produced partly by the elastic effect of metal bellows and partly by the pressure of a sealing liquid.

A further object of the invention is the provision of a liquid sealed slip-ring packing gland construction which can be inserted and replaced as a whole.

Further objects and advantages of the invention will be apparent from the following description.

In the liquid sealed slip-ring packing gland of the invention, at least one centered metal bellows, encircling the shaft and joined at each end to a slip-ring, rests loosely in the packing gland housing, the sealing pressure being produced partly by the elastic effect of the metal bellows and partly by the pressure of a sealing liquid.

The invention will be explained in greater detail with reference to the accompanying drawing in which:

Fig. 1 shows a section through the axis of a packing gland embodying the invention including a part of the machine driven through the gland; and Figs. 2 and 3 are fragmentary representations of another form of a bearing surface for the slip-rings in a section in the direction of the axis and in elevation on one of the bearing surfaces with removed slip-ring, respectively.

From the housing 1 of the pump to be driven, for instance, of which a turbine wheel 2 is shown, extends a bracket 3 that carries the packing gland housing 4. This housing is joined to the inner cover 5 by screws. The cover 5 and the end wall 6 carry the special roller bearings 7, 8 for the special packing gland shaft 9. In this manner the shaft is mounted especially free from vibration and exactly centered and forms the connection between driving shaft 12 and driven shaft 13 through the flexible couplings 10, 11. The packing gland shaft is provided at the middle of its length with a disk 14 which forms bearing surfaces for the inner slip-rings 15, 16 carried by the compressed metal bellows 17, 18 encircling the shaft. These bellows also carry slip-rings 19, 20 at their outer ends. Shoulders 27, provided in cover 5, end wall 6 and disk 14, enclose the slip-rings, whereby elements 15, 17, 19 or 16, 18, 20, which turn freely between housing and disk, that is, are not rigidly joined either to the housing or to the shaft, are exactly centered.

These freely rotating elements are enclosed by a sealing liquid 21 that acts as lubricant and is supplied through pipe 22. For liquid penetrating into chamber 23, an outlet pipe 24 is provided. The sealing liquid is kept at a pressure that is somewhat higher than the outer pressure or somewhat higher than the inner pressure according to whether increased pressure or decreased pressure prevails in the housing 1 and means is therefore provided for varying the pressure on the sealing liquid in accordance with the pressure in the driven device. Such means may comprise a conduit 29 connecting the interior of the pump housing at 30 with a sealing liquid reservoir 28 in supply pipe 22. In this way, the pressure of the slip-rings in the direction of the axis on their bearing surfaces is produced both by the spring metal bellows and by the pressure of the sealing liquid.

The packing gland can be constructed, serviced and replaced as a whole with its shaft.

For high pressures, the bearing surfaces for the slip-rings may be subdivided, for example, as shown in Figs. 2 and 3. In this form, the bearing surfaces consist of two parts 25 and 26, the upper, 25, of which is smooth and serves for sealing, while the other, 26, is provided with depressions diminishing in the direction of rotation and serves as comb bearing. The shoulders 27 maintain the centering, as described above.

In operation, the metal bellows rotate due to the friction of the slip-rings on the disc 14, but attain only a speed of rotation considerably below the speed of rotation of the rotor since both the friction on the fixed bearing surfaces and the liquid friction exert a braking effect. The result is a reduced frictional speed of the rings, 19, 15, 16, 20 on their respective bearing surfaces. In case of an unforeseen complete braking down of the slipping movement at one of the bearing surfaces, the other surface can take over the entire slipping speed without disturbance of operation.

I claim:

1. A packing gland construction for rotating shafts which comprises a gland housing, one wall of which is subject to the pressure of a fluid to be sealed, said wall having an opening through which the shaft projects into said housing, an elastic bellows concentrically positioned about the shaft within said housing, a slip-ring mounted on each end of said bellows, an imperforate flange on the shaft within said housing, a bearing surface carried by said flange in contact with one of said slip-rings, a bearing surface carried by said housing wall surrounding the opening through which the shaft projects and in contact with the other of said slip-rings, said bellows being maintained under compression in the axial direction between said bearing surfaces, the interior of said bellows being in direct pressure communication with the fluid to be sealed, and means for maintaining a body of sealing liquid about the external surface of said bellows and the joints between said slip-rings and their corresponding bearing surfaces.

2. A packing gland construction for rotating shafts which comprises a gland housing, one wall of which is subject to the pressure of a fluid to be sealed, said wall having an opening through which the shaft projects into said housing, an elastic bellows concentrically positioned about the shaft within said housing, a slip-ring mounted on each end of said bellows, an imperforate flange on the shaft within said housing, a bearing surface carried by said flange in contact with one of said slip-rings, a bearing surface carried by said housing wall surrounding the opening through which the shaft projects and in contact with the other of said slip-rings, said bellows being maintained under compression in the axial direction between said bearing surfaces, the interior of said bellows being in direct pressure communication with the fluid to be sealed, and means for maintaining a body of sealing liquid about the external surface of said bellows and the joints between said slip-rings and their corresponding bearing surfaces, at least one of said bearing surfaces comprising a continuous sealing portion and a discontinuous comb bearing portion.

3. In an apparatus including a chamber containing a fluid, a driven device within said chamber and an opening in a wall of said chamber through which a rotatable driving shaft extends, a packing gland housing around said shaft and connected to said chamber wall to provide a closed passageway connecting said chamber to said housing and surrounding said shaft, an elastic bellows concentrically positioned about said shaft within said housing, a slip-ring mounted on each end of said bellows, an imperforate flange on said shaft within said housing, a bearing surface carried by said flange in contact with one of said slip-rings, a bearing surface carried by the wall of said housing surrounding said passageway and in contact with the other of said slip-rings, said bellows being maintained under compression in the axial direction between said bearing surfaces, the interior of said bellows being in direct pressure communication with the fluid to be sealed, means for maintaining a body of sealing liquid about the external surface of said bellows and the joints between said slip-rings and their corresponding bearing surfaces, and means for varying the pressure on said liquid in accordance with the pressure in said chamber.

4. A packing gland construction for rotating shafts which comprises a gland housing surrounding said shaft, one wall of which housing is subject to the pressure of fluid to be sealed, said wall having an opening through which the shaft projects into said housing, an opposite wall of said housing having a second opening through which the shaft extends from said housing, an imperforate radially extending flange carried by said shaft and positioned within the housing between said openings, an elastic bellows concentrically positioned about the shaft between said first mentioned opening and said flange, a slip-ring mounted on each end of said bellows, a bearing surface carried by said flange in contact with one of said slip-rings, a bearing surface carried by said housing wall surrounding said first mentioned opening and in contact with the other of said slip-rings, said bellows being maintained under compression between said bearing surfaces, a second elastic bellows concentrically positioned about the shaft between said flange and said second mentioned opening, a slip-ring mounted on each end of said second mentioned bellows, a bearing surface carried by said flange in contact with one of the slip-rings of said second mentioned bellows, a bearing surface carried by said housing wall surrounding said second mentioned opening and in contact with the other slip-ring of said second mentioned bellows, said second mentioned bellows being maintained under compression between the bearing surfaces confining its slip-rings, and means for maintaining a body of sealing liquid about the external surfaces of both of said bellows and the joints between said slip-rings and their corresponding bearing surfaces.

5. A packing gland construction as defined in claim 4 wherein at least one of said bearing surfaces comprises a continuous sealing portion and a discontinuous comb bearing portion.

EDOARDO ERNI.